US008361180B2

(12) United States Patent
Lim et al.

(10) Patent No.: US 8,361,180 B2
(45) Date of Patent: Jan. 29, 2013

(54) DURABLE NANOWEB SCRIM LAMINATES

(75) Inventors: Hyun Sung Lim, Midlothian, VA (US); Cheng Hang Chi, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 387 days.

(21) Appl. No.: 11/986,926

(22) Filed: Nov. 26, 2007

(65) Prior Publication Data

US 2008/0134652 A1    Jun. 12, 2008

Related U.S. Application Data

(60) Provisional application No. 60/861,178, filed on Nov. 27, 2006.

(51) Int. Cl.
*B01D 46/52* (2006.01)
*B01D 39/16* (2006.01)

(52) U.S. Cl. ............... 55/486; 55/487; 55/521; 55/527; 55/528

(58) Field of Classification Search .................... 55/527, 55/528, 486, 487, 497, 521
See application file for complete search history.

(56) References Cited

U.S. PATENT DOCUMENTS

| | | | |
|---|---|---|---|
| 425,189 A | 4/1890 | Shaw | |
| 3,531,920 A | 10/1970 | Hart | |
| 4,127,706 A | 11/1978 | Martin et al. | |
| 4,720,292 A | 1/1988 | Engel et al. | |
| 5,082,476 A | 1/1992 | Kahlbaugh et al. | |
| 5,104,537 A | 4/1992 | Stifelman et al. | |
| 5,613,992 A | 3/1997 | Engel | |
| 5,820,646 A | 10/1998 | Gillingham et al. | |
| 5,853,442 A | 12/1998 | Glen et al. | |
| 5,954,849 A | 9/1999 | Berkhoel et al. | |
| 6,673,136 B2 * | 1/2004 | Gillingham et al. | 95/273 |
| 6,716,274 B2 * | 4/2004 | Gogins et al. | 95/273 |
| 6,721,987 B2 * | 4/2004 | McDevitt et al. | 15/227 |
| 6,743,273 B2 * | 6/2004 | Chung et al. | 55/482 |
| 6,746,517 B2 * | 6/2004 | Benson et al. | 95/273 |
| 6,800,117 B2 * | 10/2004 | Barris et al. | 95/273 |
| 6,872,311 B2 * | 3/2005 | Koslow | 210/502.1 |
| 6,875,256 B2 * | 4/2005 | Gillingham et al. | 95/273 |
| 7,008,465 B2 | 3/2006 | Graham et al. | |
| 2004/0038014 A1 | 2/2004 | Schaefer et al. | |
| 2004/0255783 A1 | 12/2004 | Graham et al. | |
| 2005/0163955 A1 | 7/2005 | Schaefer et al. | |
| 2006/0137317 A1 * | 6/2006 | Bryner et al. | 55/528 |
| 2006/0137318 A1 * | 6/2006 | Lim et al. | 55/528 |
| 2008/0070463 A1 * | 3/2008 | Arora et al. | 442/327 |
| 2008/0110342 A1 * | 5/2008 | Ensor et al. | 96/54 |

FOREIGN PATENT DOCUMENTS

| | | |
|---|---|---|
| DE | 19630522 | 7/1996 |
| EP | 0429805 B1 | 10/1990 |
| EP | 1048335 | 11/2000 |
| WO | WO 03/080905 A1 | 10/2003 |
| WO | WO2004018079 | 3/2004 |
| WO | WO 2006/071979 | 7/2006 |

OTHER PUBLICATIONS

PCT International Search Repoer and Written Opinion for International Application No. PCT/US2007/024449 dated Nov. 27, 2007.

* cited by examiner

*Primary Examiner* — Robert Clemente

(57) ABSTRACT

A filter media comprising a nanofiber layer and a substrate layer; the nanofiber layer comprising a polymer material and having a fiber diameter of about 0.01 to 1.0 micron, a basis weight of about 0.5 to 30 gsm, and a thickness of at least about 2 microns, the nanofiber layer further having a surface stability index of at least about 5 kN/m, the media further being pleated.

3 Claims, No Drawings

DURABLE NANOWEB SCRIM LAMINATES

FIELD OF THE INVENTION

The invention relates to a filter medium and filter structures that can be used generally in filtration applications including in a vacuum cleaner, a dust collector, a gas turbine inlet air filter system, a heating, ventilating, and air conditioning filter system, or a variety of other applications to remove dust, dirt, and other particulate from a gaseous or contaminated air stream.

BACKGROUND

Gas streams often carry particulate material. In many instances, it is desirable to remove some or all of the particulate material from a gas flow stream. For example, air intake streams to engines for motorized vehicles or power generation equipment, gas streams directed to gas turbines, and air streams to various combustion furnaces, often include entrained particulate material. The particulate material, should it reach the internal workings of the various mechanisms involved, can cause substantial damage. Removal of the particulate material from the gas flow stream upstream of the engine, turbine, furnace, or other equipment involved is often needed. Another example is the commercial and residential heating, ventilating, and air conditioning (HVAC) filter system. Air streams to HVAC system often carry particulate material such as pollens, spores, atmospheric dust, and other sub-micron particles. Removal of the particulate material is desirable to reduce allergic reaction as well as potential health risks.

Nanofibers and web compositions that comprise nanofibers have improved properties that can be used in a variety of applications including the formation of filter media for filtration applications. See for example U.S. Pat. No. 7,008,465 which describes the use of nanofibers in air filtration applications.

In making fine fiber filter media, a variety of materials have been used including fiberglass, metal, ceramics, and a range of polymeric compositions. A variety of fiber forming methods or techniques has been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

In filtration applications, it is commonly known to pleat the filter medium in order to increase the effective surface area available for fluid impact. Nanofiber webs made by conventional techniques result in poor fiber surface stability of the nanofiber web layer. Lower bond strength between scrim and nanofiber web layer have resulted in unacceptable pleating quality for making pleated filter. The nanofiber webs are abraded from pleating rolls and the nanoweb layer is delaminated from the scrim during the pleating process.

To protect from the fiber abrasion and delamination of the nanoweb layer, a second scrim is commonly used to make a "SNS" (i.e. scrim—nanoweb—scrim) structure. The second scrim is bonded by adhesive or ultrasonic and thermo bond which adds cost and thickness to the product. The thicker product may limit pleating density (number of pleats per inch) in a pleated filter.

For example in one commercial embodiment of the prior art, the pleated filters are made from "SNS" structure which is bonded by ultrasonic bond technology.

In a second commercial embodiment, pleated filters are made from "SN" structure, but the basis weight of the nanofiber web layer is typically less than 0.5 grams per square meter (gsm) and its scrim are made from wet-laid paper and spunbond nonwovens.

In a third commercial embodiment, the medium is an "SN" structure in which the basis weight of the nanofiber layer is less than 2 gsm and its scrim is 130 gsm spunbond polyethylene terephthalate (PET).

The filter industry needs a nanoweb plus scrim structure that retains the superior filtration properties of the nanoweb layer while being pleatable with no further modification.

The present inventors have found a way to circumvent the problems associated with pleating simple nanoweb plus scrim structures.

SUMMARY OF THE INVENTION

This invention is directed at a filter media comprising a nanofiber layer and a substrate layer; the nanofiber layer comprising a polymer material and having a fiber diameter of about 0.01 to 1.0 micron, a basis weight of about 0.5 to 30 gsm, and a thickness of at least about 2 microns, the nanofiber layer further having a surface stability index of at least about 5 kN/m, the media further being pleated.

DETAILED DESCRIPTION OF THE INVENTION

The terms "nanoweb" and "nanofiber web" as used herein are synonymous. Similarly the terms "scrim" and "substrate" are synonymous.

As used herein, the term "nonwoven web" or "nonwoven material" means a web having a structure of individual fibers, filaments, or threads which are interlaid, but not in a regular or identifiable manner such as those in a knitted fabric or films that have been fibrillated. Nonwoven webs or materials have been formed from many processes such as, for example, meltblowing processes, spunbonding processes, and bonded carded web processes. The basis weight of nonwoven webs or materials is usually expressed in ounces of material per square yard (osy) or grams per square meter (gsm), and the fiber diameters usable are usually expressed in microns.

A "scrim" is a support layer and can be any planar structure with which the nanoweb can be bonded, adhered, or laminated. Advantageously, the scrim layers useful in the present invention are spunbond nonwoven layers, but can be made from carded webs of nonwoven fibers and the like. Scrim layers useful for some filter applications require sufficient stiffness to hold pleats and dead folds.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The as-spun nonwoven web comprises primarily or exclusively nanofibers that are produced by electrospinning, such as classical electrospinning or electroblowing, and in certain circumstances, by meltblowing processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

The following electroblowing process conditions can be used to manufacture the web of the invention.

Voltage applied to the spinneret is preferably in the range of about 1 to 300 kV and more preferably of about 10 to 100 kV. The polymer solution can be discharged in a pressure ranging from about 0.01 to 200 kg/cm$^2$ and in preferably about 0.1 to 20 kg/cm$^2$. This allows the polymer solution to be discharged in large quantity in an adequate manner for mass production. The process of the invention can discharge the polymer solution with a discharge rate of about 0.1 to 5 cc/min-hole.

Compressed air injected via the air nozzle has a flow rate of about 10 to 10,000 m/min and preferably of about 100 to 3,000 m/min. Air temperature is preferably in the range of about 300° C. and more preferably of about 100° C. The die to collector distance (DCD), i.e. the distance between the lower end of the spinning nozzle and the suction collector, is preferably about 1 to 200 cm and more preferably 10 to 50 cm.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a T$_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the T$_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer T$_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

In an electroblowing process the suction pressure at collector vacuum under spinning beam and vacuum pressure in the dryer section are very important process parameters that control the nanofiber surface stability and bond strength between the nanoweb layer and the scrim. The nanoweb layer under the spinning beam is tackier and is solvated with spinning agent. The high suction pressure allows the nanoweb to consolidate with the scrim layer and promote "fiber to fiber" bonding by its tackiness with spinning agent. The mechanical anchoring of the nanoweb into the scrim is increased with the high suction pressure.

The invention can be used in the form of filter media, filter cartridges, in the form of a flat panel or cylindrical unit and can be used in a variety of filtering method applications. Such applications include filtering both gaseous and liquid flows, vacuum cleaner, dust removal, automotive, and other transportation applications (including both wheeled vehicles and filtration applications in aircraft equipment), use of these materials in the Powercore (Z-media) applications by Donaldson Company, Inc., filtration of gas turbine intake power station streams, filtering room air for military, residential, industrial, and healthcare, semiconductor manufacture and other applications where reduction of small particulate is important for health, effective production, cleanliness, safety, or other important purposes, filtering air streams in military applications for the purpose of removing biohazard or chemhazard materials from the local environment, filtration for closed ventilation equipment, used, for example, in a space shuttle, aircraft air recirculation, submarines, clean rooms, and other such closed applications as a high efficiency filter in respirator devices used by public service/safety personnel such as police and fire, military personnel, civilian populations, hospital populations, industrial workers, and others requiring a high degree of efficiency in removing small particulate from inhaled atmospheres.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, shows a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Des. Pat. No. 425,189, discloses a panel filter using the Z filter design.

Pleating can be carried out by any method known to one skilled in the art. For example, a method for producing a pleated filter medium with stamped protrusions is described in U.S. Pat. No. 3,531,920. According to this method, the filter material is passed from a roll to a press which includes two heated cylinders rotating in opposite directions. The cylinders are provided with meshing protrusions and the corresponding recesses, and the filter material passed through between them is durably shaped by deep-drawing. The shaping process influences the structure of the filter material in the deep-drawn area, and thereby changes the original filtering properties in the areas important to the filtering.

An improvement in the method described above is achieved by the method described in European Published Patent Application No. 0 429 805. In this method, a flat filter medium is gathered transversely to the running direction by rolls, and subsequently, elongated protrusions are stamped into the gathered material by the dies of a shaping device. The gathering prevents the additional material, required by the stamped protrusions, from leading to tensions in the material and the structure from being changed in the deep-drawn area of the filter medium.

German Published Patent Application No. 196 30 522 describes scoring and bonding a formed fabric made of stretched and unstretched synthetic fibers between profiled calender rolls. By this method a filter material could be produced from a nonwoven fabric without having a change in the homogeneity of the nonwoven fabric appearance.

There are two type of pleaters; blade and rotary. The operation of the blade pleater involves preheating the web followed by two blades which in up and down movements create pleats. A post heated zone under pressure is used to stabilize pleats. The operation of a heated rotary pleater involves scoring the media with a heated rotary knife and folding the scoring line to form a pleat under pressure.

Test Methods

Surface Stability Index (SSI) is a measure of the tendency of the fibers at the surface of the web to break free upon being pulled. Surface stability index of the web was measured by the following technique. A magnetic bar was placed into the lower mount point on an extensometer (MTS QUEST™ 5). A steel plate approximately 10.2 cm×15.2 cm was placed on top of the magnet. On the steel plate, a piece of 2-sided tape was firmly attached, the tape being about 6.4 cm wide and about 7.6 cm long. A piece of the material to be tested, at least 5.1 cm×5.1 cm was laid gently, but smoothly atop the 2-sided tape. Care was taken not to disrupt the surface of the material being tested; wrinkles and folds were avoided.

The test probe was a steel cylinder, with an end diameter of 1.59 cm (0.625 inch) (Area=1.98 $cm^2$). The end of this probe was covered with a piece of the same 2-sided tape, and the tape was cut to fit the probe. The probe was mounted into a 50 N load cell on the extensometer crosshead. The crosshead was lowered so that the probe was 500 µm-1000 µm above the surface of the sample. This starting point was assigned as zero extension.

The probe was allowed to travel downward (toward the sample) at a continuous rate of 0.127 cm/min (0.050 in/min). The probe continued down until a normal force of 2.2 N (0.5 lbf) was established between the sample and the probe. The probe remained in this position for 10 seconds. The probe direction was then reversed and it traveled away from the sample at a continuous rate of 0.254 cm/min (0.10 in/min). This motion continued until the crosshead reached its starting point.

The slope of a Load vs. Extension graph near the Load=0 axis for the unloading portion of the test was extracted from the data. The start point for slope calculation was assigned as near to the Load=0 axis as possible, with preference given to a point with a positive load value. The end point was chosen along the linear portion of the unloading curve, at a point more than 10 µm (in extension) from the start point. The test software automatically fitted a least squares linear trendline to the data between the start point and end point and the slope of the trend line was reported in lb/in or N/m. The absolute value of the slope was reported as surface stability index (SSI).

The measurement was made five times on the nanoweb side of a given sample, but no specimen was reused (i.e. the test was destructive). Both pieces of tape (on the sample plate and the probe) were replaced after each measurement. The five specimen values are averaged to give a single surface stability value for the sample.

Basis Weight (BW) was determined by ASTM D-3776, which is hereby incorporated by reference and reported in $g/m^2$ (gsm).

Fiber Diameter was determined as follows. Ten scanning electron microscope (SEM) images at 5,000× magnification were taken of each fine fiber layer sample. The diameter of eleven (11) clearly distinguishable fine fibers were measured from the photographs and recorded. Defects were not included (i.e., lumps of fine fibers, polymer drops, intersections of fine fibers). The average (mean) fiber diameter for each sample was calculated.

Thickness was measured using scanning electron microscopy. The thickness is reported in microns.

EXAMPLES

The following examples were prepared to illustrate the invention.

Example 1

For Example 1, a 24% solution of polyamide-6,6 in formic acid was spun by electroblowing as described in WO 03/080905. Voltage applied to the spinneret was 85 kV and polymer solution was spun at a throughput rate of 2.0 cc/hole/min with the holes in the nozzle spaced 1 cm apart. Example 1 was collected onto 70 gsm polyester scrim or substrate layer at a collector vacuum of 80 mm water column, and a dryer vacuum of 40 mm water column. The line speed was 14.5 m/min and webs of basis weight 4.2 gsm were produced. The spinning room temperature was approximately 27° C. and the room humidity was 88%. The distance from the die to the collector was set to 400 mm. The process gas temperature was 38° C. at respective flow rates of 4 cubic meters per min per meter of nozzle width. The fibers had a fiber diameter of 0.3 microns. The surface stability test was conducted and the surface stability index obtained was 14.3 kN/m (81.5 lbf/in).

The webs were pleated according to the following procedures. Pleating trials were conducted with a blade pleating machine which consists of double blades and a heated zone to stabilize pleats under temperature and pressure. The pleat depth was set at 30 mm and pleating speed was 75 pleats per minute. Pleating performance was rated based on pleat formation and uniformity, integrity of the media after pleating as well as damage to the media based on visual observations. The pleating performance was excellent with good pleat definition and uniformity. No de-lamination, layer separation, or damages were observed.

Example 2

For Example 2, a 24% solution of polyamide-6,6 in formic acid was spun by electroblowing as described in WO 03/080905. Voltage applied to the spinneret was 85 kV and polymer solution was spun at a throughput rate of 1.0 cc/hole/min with the holes in the nozzle spaced 1 cm apart. Example 2 was collected onto 70 gsm polyester scrim or substrate layer at a collector vacuum of 80 mm water column, and a dryer vacuum of 20 mm water column. The line speed was 25 m/min and webs of basis weight 1.2 gsm were produced. The spinning room temperature was approximately 27° C. and the room humidity was 80%. The distance from the die to the collector was set to 420 mm. The process gas temperature was 38° C. at respective flow rates of 4 cubic meters per min per meter of nozzle width. The fibers had a fiber diameter of 0.3 microns. The surface stability index was tested to be 7.97 kN/m (45.5 lbf/in).

The webs were pleated according to the same procedure as in Example 1. The pleating performance was marginally acceptable.

Comparative Example A

For Comparative Example A, a 24% solution of polyamide-6,6 in formic acid was spun by electroblowing as described in WO 03/080905. Voltage applied to the spinneret was 85 kV and polymer solution was spun at a throughput rate of 1.0 cc/hole/min with the holes in the nozzle spaced 1 cm apart. The fibers were collected onto 75 gsm polyester scrim or substrate layer at a collector vacuum of 80 mm water column, and a dryer vacuum of 20 mm water column. The line speed was 15 m/min and webs of basis weight 2 gsm were produced. The spinning room temperature was approximately 31° C. and the room humidity was 50%. The distance from the die to the collector was set to 400 mm. The process gas temperature was 58° C. at respective flow rates of 4 cubic meters per min per meter of nozzle width. The fibers had a fiber diameter of 0.6 microns. The surface stability index was tested to be 4.25 kN/m (24.3 lbf/in).

The webs were pleated according to the same procedure as in Example 1. The pleating performance was unacceptable. De-lamination and separation of the nanoweb from the scrim occurred, which created damage to the nanoweb and poor pleat formation.

The invention claimed is:

1. A filter media consisting of a nanofiber layer and a substrate layer; the nanofiber layer comprising a polymer material and having a fiber diameter of about 0.01 to 1.0 micron, a basis weight of about 0.5 to 30 gsm, and a thickness of at least about 2 microns, the nanofiber layer further having a surface stability index of at least about 5 kN/m, the media further being pleated.

2. A filter comprising the filter media of claim 1.

3. The filter media of claim 1 wherein the substrate layer comprises a nonwoven comprising spunbond fiber, dry-laid or wet-laid fiber, cellulose fiber, melt blown fiber, glass fiber, or blends thereof.

* * * * *